United States Patent [19]

Mills

[11] 3,863,030

[45] Jan. 28, 1975

[54] PCM TONE RECEIVER USING DIGITAL SPECTRUM ANALYSIS

[75] Inventor: Jeffrey P. Mills, Forest Park, Ill.

[73] Assignee: GTE Automatic Electric Laboratories Incorporated, Northlake, Ill.

[22] Filed: Nov. 24, 1972

[21] Appl. No.: 309,020

Related U.S. Application Data

[63] Continuation-in-part of Ser. No. 258,799, June 1, 1972, abandoned.

[52] U.S. Cl. .......................... 179/15 BY, 179/84 VF

[51] Int. Cl. .......................... H04j 3/12

[58] Field of Search ...... 179/15 AP, 15 AV, 15 BY, 179/16 EC, 1 SA, 84 VF, 1 SM; 324/77 R, 77 A, 77 B; 325/38 R, 38 A

[56] References Cited

UNITED STATES PATENTS

| | | | |
|---|---|---|---|
| 3,544,723 | 12/1970 | Battista | 179/84 VF |
| 3,548,107 | 12/1970 | Lim | 179/15 AP |
| 3,578,919 | 5/1971 | O'Neill | 179/84 VF |
| 3,710,028 | 1/1973 | Pitroda | 179/16 EC |

*Primary Examiner*—William C. Cooper
*Assistant Examiner*—Randall P. Myers

[57] ABSTRACT

Method and apparatus for detecting one or more tone signals in a PCM signal corresponding to an original analog voltage, without converting the PCM signal to analog, including sequentially monitoring samples of the PCM signal using an expression, $V_f$, in Fourier spectrum analysis selectively for the respective tone signals to be detected, and storing and accumulating the magnitude of $V_f$, wherein the determined magnitude of $V_f$ for each tone signal is proportional to the magnitude of the tone signal in the original analog signal.

An improved method and apparatus for detecting one or more tone signals in a PCM signal, $V_c$, corresponding to an original analog voltage, $V_a$. The accumulated magnitude, $V_f$, is compared with another accumulated quantity, $V_r$, derived from the incoming PCM signal, to determine if the amplitude of the respective tone exceeds a certain percentage of that of the entire signal. This allows the detector to operate correctly under varying levels of the analog signal.

16 Claims, 3 Drawing Figures

PCM TONE RECEIVER USING DIGITAL SPECTRUM ANALYSIS

This is a continuation-in-part of application Ser. No. 258,799, filed June 1, 1972, now abandoned.

This invention relates to signal detecting and in particular to apparatus and a method for detecting one or more audio frequencies (tones) contained in a Pulse-Coded Modulation (PCM) signal.

BACKGROUND OF THE INVENTION

Pulse-Coded Modulation (PCM) is a system of audio frequency transmission whereby the continuously varying (analog) audio signal is coded into a series of digital binary pulses, transmitted over a distance, and then converted back to analog. The signal, while in digital form, may be transmitted over very large distances. Any distortion or attenuation introduced by the transmission medium can be corrected for at strategic points ("repeaters") since the full amount of information can be recovered from the digital pulse-coded signal at each repeater. Furthermore, many audio signals can be combined onto one PCM line, and later separated, so that the line can transmit many conversations simultaneously without interference between conversations. This multiplexing is achieved by sequentially transmitting one pulse from each conversation onto the line, and, at the receiving end of the line, using a demultiplexer to divert each pulse to the correct converter, each of which then converts the pulses of one conversation back to the conventional analog form. The principle is described in various publications, and reference may be made for instance to "An Introduction to PCM Switching," Automatic Electric Technical Journal, April, 1971.

Control signal information, such as the number being called, etc., is conveyed over conventional telephone lines by audio-frequency tones, such as the Touch Calling Multifrequency (TCMF) and the Two-Out-of-Six Multifrequency (2/6 MF) schemes. In these schemes two audio-frequencies are generated by oscillators and applied to the conventional telephone line, and filters are used at the receiving end to detect the presence of these control signal tones and cause the system to operate accordingly.

Although many different schemes could be used to transmit the control signal information over PCM lines, it is desired, for compatability reasons, to inject the same tones into the analog circuitry and code them, like any other audio signal, such as voice signals, into the PCM format. Then, at the receiving end, the demultiplexer could convert this pulse-coded tone back to analog, and the presence of the tones may be detected, as with conventional telephone lines, by filters, as set forth for example in U.S. Pat. No. 3,544,723. This patent also suggests the detection of a PCM tone signal by comparing an incoming signal to its delayed derivative, the detection being effected in the PCM domain.

SUMMARY OF THE INVENTION

In accordance with the principles of the present invention a PCM tone signal is detected using logic circuits in a novel PCM receiver combination, without the necessity of converting the PCM signal to analog and then filtering it, and without the necessity for deriving the derivative of the PCM signal. The novel PCM receiver detector monitors consecutive codes on a PCM channel and uses a well-known mathematical principle known as Fourier spectrum analysis to detect the presence of a specific audio frequency in the coded audio signal. The detector repeatedly samples the incoming PCM signal to determine the presence of each of six frequencies used for control, and, furthermore, detects the relative strength of each such control or signalling frequency.

The mathematical principle of spectrum analysis used in this invention consists of computing the Fourier coefficients of the spectrum of the incoming signal, and is well known. However, it has been heretofore ignored for use in detection circuits since it involves mathematical operations which either require complex logic circuitry, or else require substantial time to complete, or both. This renders the scheme undesirable when used in its classical form. However, this invention uses a simplified manner of executing the required operations such that it becomes more desirable to use this PCM tone signal detector than those of the prior art.

In one embodiment of the invention, the magnitude of the Fourier spectrum analysis expression, $V_f$, for sequential samples of each tone to be detected in the PCM signal, is stored and accumulated, the accumulated magnitude being proportional to the amplitude of the tone signal present in the analog signal represented by the PCM signal.

Since the average strength of this analog signal may vary, it is desirable that the apparatus be provided with means for comparing the amplitude of each tone with some measure of the strength of the entire analog signal, in order to reliably detect the audio tones.

In the above mentioned embodiment it is assumed that each sample of the PCM signal is present at the input of the receiver for a full 125 microseconds. However, with a system having several serially multiplexed channels, the samples are presented only $125/n$ microseconds, where $n$ is the number of channels, normally 24. It is therefore necessary to use a signal demultiplexer, such as $n$-memories at the receiver input, one to store the sample for each channel for the required time.

Finally, in serially accessing the memories and accumulators of the aforementioned embodiment, the speed of the logic gates used in the receiver may be insufficient to complete all required operation in the allotted time of 125 microseconds, depending on the type of gates used.

Therefore, in the preferred embodiment of the invention concerning a system having a plurality of multiplexed PCM channels, there is provided an improved PCM tone receiver operable under varying analog signal levels with more efficient audio tone detection and having fewer sequential logic operations per PCM channel.

These and other objectives of the preferred embodiment of the present invention are efficiently achieved by providing the tone receiver with a reference accumulator for accumulating a quantity, $V_r$, proportional to the average strength of $V_a$, the analog signal corresponding to $V_c$, the incoming PCM signal. The contents of the two accumulators for each tone to be detected are then compared with the contents of the reference accumulator to detect the presence of a given tone, regardless of the average strength of the analog signal. A minimum value for $V_r$ may also be provided in order to reject very weak tones. An inverter is added at the output of the accumulators to simplify the signal processing circuitry. To decrease the number of serial operations per channel, several of the system memories and accumulators may be accessed in parallel. The accumulators are duplicated for each channel of a multichannel receiver and are sequentially scanned by a selector and a decoder of increased capacity. Duplication of other per-channel circuitry is thereby avoided and the requirement for an input signal demultiplexer is eliminated.

The foregoing as well as other objectives, features and advantages of the present invention will become more readily understood, from the following detailed description taken in conjunction with the appended drawings.

DETAILED DESCRIPTION

As described in the aforementioned publication, the analog signal such as voice or tone is non-linearly coded into the PCM signal, in order to reduce quantizing noise. The non-linear relationship between $V_{out}$, the "compressed" voltage, and $V_{in}$, the original analog signal is:

$|V_{out}| = V_{max} \log [1 + \mu |V_{in}/V_{max}|]/\log(1 + \mu)$;

and with the understanding that $V_{out}$ and $V_{in}$ have identical signs. This expression, with $\mu$ (the compression characteristic) equal to 255, and converting the logarithm from the natural base to the base 256, becomes:

$$V_c = S \cdot \log_{256}(1 + 255 \cdot |V_a|)$$

where $V_a$ is the original analog signal (normalized so that its maximum value is 1, i.e., $V_a = V_{in}/V_{max}$), $S$ is the sign of $V_a$ (either +1 or 1), $\log_{256}$ represents the logarithm to the base 256, and $V_c$ is the compressed voltage as coded in PCM ($V_c = V_{out}/V_{max}$). To restore the analog voltage at the receiving end, the following relation is used:

$$V_a = S \cdot (256^{|V_c|} - 1)/255$$

The known mathematical principle of Fourier spectrum analysis states that, with $V_f$ defined as follows:

$$V_f = \sum_{t=1}^{n} V_a (\cos 2\pi ft + j \sin 2\pi ft),$$

(where $J = \sqrt{-1}$, the imaginary-number prefix) the quantity $|V_f|$ will be proportional to the amount of the frequency, $f$, which is contained in $V_a$. From the above, it may be shown that $$V_f = \sum_{t=1}^{n} S \cdot [(256^{|V_c|} - 1)/255] (\cos 2\pi ft + j \sin 2\pi ft)$$

and finally that (where $S'$ is the sign of $\cos 2\pi ft$ and $S''$ is the sign of $\sin 2\pi ft$)

$$V_f = \sum_{t=1}^{n} S \cdot [S' \cdot (256^{|V_c| + \log_{256}|\cos 2\pi ft|} - 256^{\log_{256}|\cos 2\pi ft|}) + jS''(256^{|V_c| + \log_{256}|\sin 2\pi ft|} - 256^{\log_{256}|\sin 2\pi ft|})]$$

Figure 1:
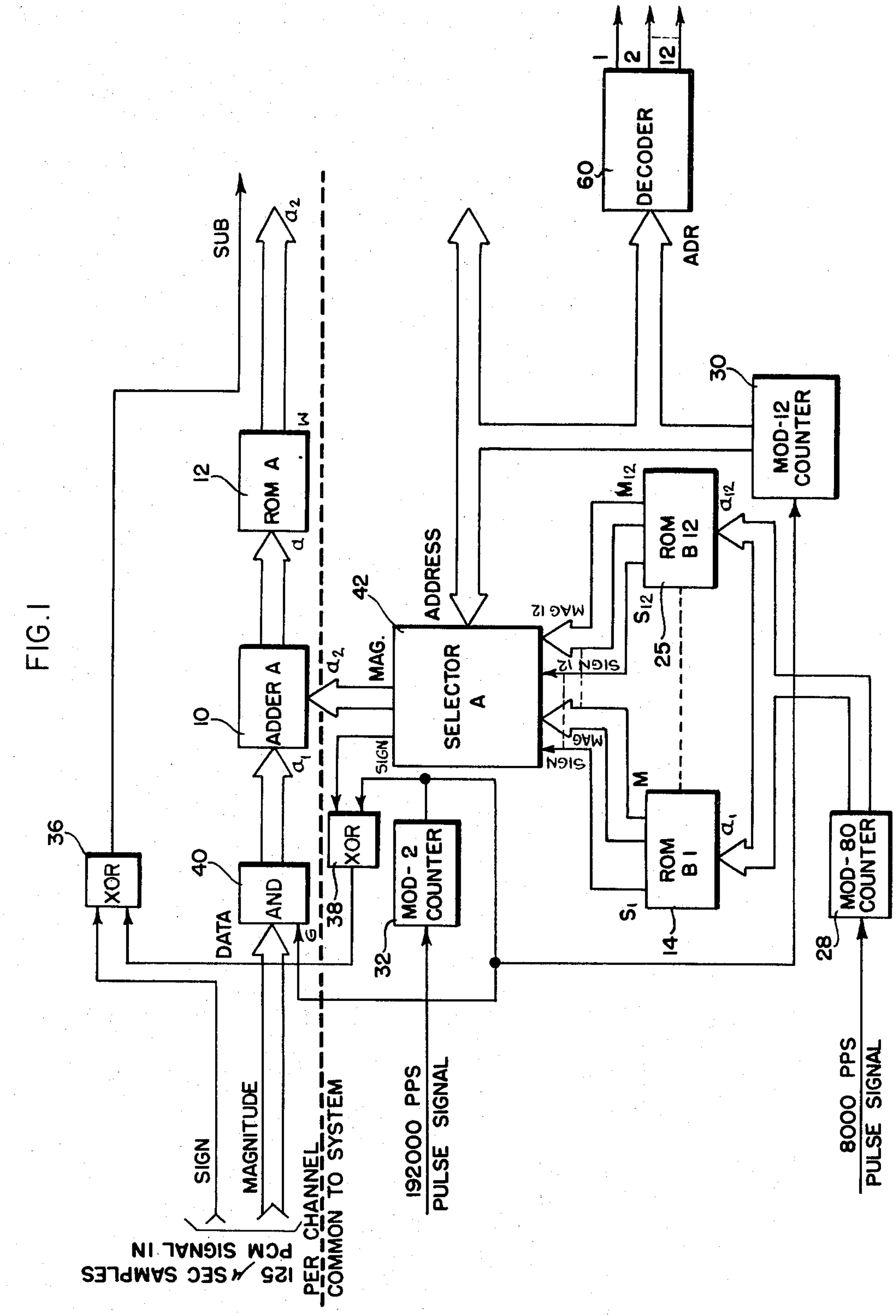
FIGS. 1 and 2 illustrate one embodiment of a PCM tone signal receiver in accordance with the present invention.
Figure 2:
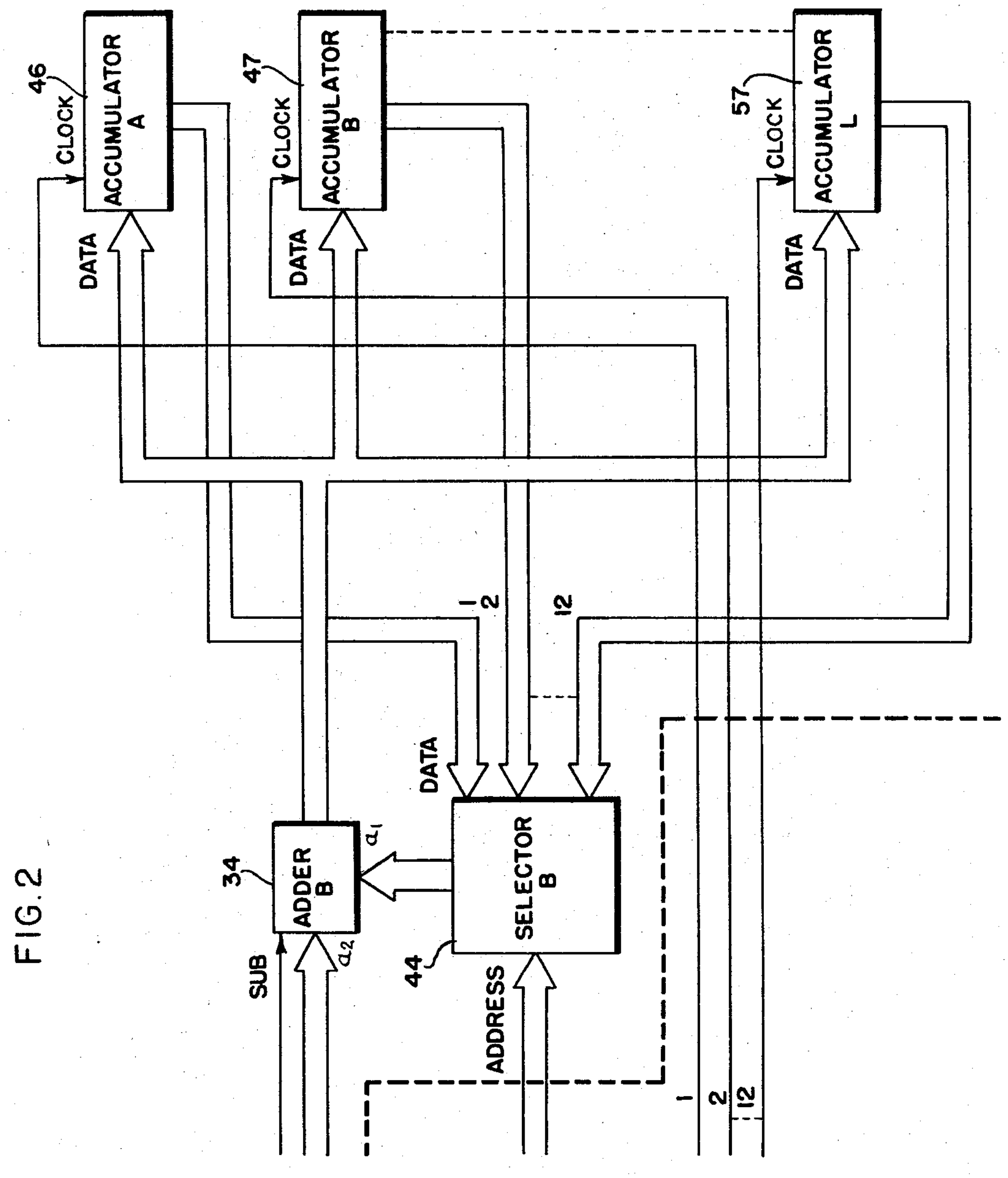

Although the above expression appears rather complex, it lends itself well to logic circuitry. The PCM detector circuitry used to perform this computation is shown in the embodiment of FIGS. 1 and 2. The quantities $S'$, $S''$, $\log_{256}|\cos 2\pi ft|$, and $\log_{256}|\sin 2\pi ft|$ are generated as reference quantities in the apparatus indicated as "common to the system." They are generated for each of the six frequencies, $f_1$ through $f_6$, and are sequentially applied to the PCM channel detector circuits. Therefore, each control tone or frequency will eventually be looked for.

It is to be understood that only one PCM channel is shown for illustrating this embodiment of the invention, whereas normally the "common" reference apparatus would be multiplexed to a plurality of PCM channels similar to that denoted as "per channel" apparatus in the illustration. The adders, the exclusive-OR circuits, the selector and decoder circuits, the Read-Only-Memory (ROM), and the accumulators are standard logic circuits which are described in computer-circuitry textbooks, publications, etc. As utilized herein such circuits and their functions can be described as follows.

An adder 10, labeled Adder A is a 7-bit adder. Its two inputs $a_1$ and $a_2$ are each 7-bit binary numbers and its output is an 8-bit binary number. They are related as, output $= a_1 + a_2$.

A memory unit 12, labeled, "Read-Only Memory (ROM) A" is a 256-word, 8-bit memory, which is written once, at the time of manufacture. The contents of each word are such that $$W = 256^{(a/128 + 1/2)},$$

where $a$ is the address of the word, and $W$ is the word itself. The memory 12 thus serves to generate the above function in response to the address, $a$. The value of the address, $a$, ranges from −128 to +127.

Similarly, the 12 memory units 14 through 25, labeled "Read-Only Memories B1 through B12," are 80-word, 8-bit memories. The first bit of each word is the "sign" bit ($s_n$), the remaining bits comprise a 7-bit binary number, the "magnitude" ($m_n$). The contents of each word are related to its address "$a_n$" as follows:

for odd $n$:

$m_n = 128 \cdot \log_{256} \cos(f_n \cdot a_n \cdot \pi/4{,}000) + 1/2$ $s_n = \text{sign}(\cos(f_n \cdot a_n \cdot \pi/4{,}000))$ and for even $n$:

$m_n = 128 \cdot \log_{256} \sin(f_n \cdot a_n \cdot \pi/4{,}000) + 1/2$ $s_n = \text{sign}(\sin(f_n \cdot a_n \cdot \pi/4{,}000))$ where $f_1 = f_2 = 700$
$f_3 = f_4 = 900$
$f_5 = f_6 = 1{,}100$
$f_7 = f_8 = 1{,}300$
$f_9 = f_{10} = 1{,}500$
$f_{11} = f_{12} = 1{,}700$ Note that $m_n$ is always a negative number. It is represented in "two's complement" form, without its sign, since its sign is always understood to be negative. Note that bit $s_n$ is not the sign of $m_n$. The memories 14–25 generate the above functions in a manner similar to memory unit 12. All Read-Only Memories 14–25 are standard digital computer circuits, specialized only by the contents of the words, which, for Read-Only Memories, are entered at the time of manufacture of either the memory itself or the system in which it is used.

The mod-80 binary counter 28 is a standard binary counter which resets itself at a count of 80. The mod-12 binary counter 30 and mod-2 binary counter 32, likewise, are binary counters which reset themselves at counts of 12 and 2, respectively. The mod-80 counter 28 is driven by an 8,000 pps pulse signal such that its contents are incremented every 125 microseconds. The mod-12 counter 30 is driven by a 96,000 pps pulse signal provided through the mod-2 counter 32, and counter 30 thus is incremented 12 times for every increment of counter 28.

The adder unit 34 labeled Adder B is an adder-subtractor, with the add-subtract function controlled by input "SUB." Input $a_1$ and the output are 16-bit binary numbers, input $a_2$ is an 8-bit binary number. The numbers are related such that:

if SUB = 0 then output $= a_1 + a_2$ and if SUB = 1 then output $= a_1 - a_2$

This is also a standard circuit used in digital computers.

Each of the exclusive-OR gates 36, 38 has two single-bit inputs and a single-bit output. Its output is a binary 0 when the two inputs are alike (1,1 or 0,0) and its output is 1 when the two inputs are different (1,0 or 0,1). This is also a standard digital-computer circuit.

The AND circuit 40 consists of seven standard AND gates and its logic is such that if input G is a logic 1 then the 7-bit output equals the 7-bit input, whereas if input G is a logic 0, then the output is a binary 0 (all bits are 0).

A selector 42 labeled "Selector A" contains 12, 8-bit data inputs and one 8-bit output, plus a 4-bit address input. Its logic is such that its output is equal to the data at the data input whose number corresponds to the binary number applied to the address input. When driven by the mod-12 counter, it causes the output to sequentially assume the values on the 12 inputs from memory units 14–25. The selector 44 labeled Selector B is identical to selector 42 except that the data inputs and output are each 16 bits.

The storage units 46 through 57, labeled "Accumulators A through L" are each standard 16-bit registers. The logic of each register is such that when the clock input is switched from 0 to 1 and back to 0, the 16-bit binary number number appearing on the data input appears on its output and remains there until the input clock is switched again, even though the data input may vary meanwhile.

The decoder 60 is a standard logic circuit which causes a pulse to appear at the output designated by the binary number on its address input. When driven by the mod-12 counter, the result is that the 12 outputs which are connected respectively to the clock input lines accumulators 46–57, are pulsed in sequence.

The PCM tone detector operation is as follows. The output of the mod-2 counter 32 is initially at 1; the outputs of the mod-12 counter 30 and the mod-80 counter 28 are at 0. A sample of the PCM code, equal to $128 \cdot V_c$, is present at the input to the tone detector (PCM signal in). The magnitude of this sample passes through the AND circuit 40 and is added by adder 10 (Adder A) to the output of memory unit 14 (ROM B1) which is, at that time, being routed through selector 42. The output of Adder A is equal to:

$$128 \cdot |V_c| + 128 \cdot \log_{256} |\cos(f_1 \cdot a_1 \cdot \pi/4,000)|$$

Since the output of ROM B1 is always understood to be negative the above sum may be positive or negative. The 8 bit specifies the sign. This sum, which is the output of adder 10, is fed into memory unit 12 (ROM A), and the output of the latter is therefore $$w = 256^{|V_c| + \log_{256} |\cos(f_1 \cdot a_1 \cdot \pi/4000)|}$$

The output of memory unit 12 (ROM A), which is always positive, is added to or subtracted from data in storage 46 (Accumulator A) by adder 34 (Adder B), depending on the sign of $V_c$ and the sign being read out of memory (ROM B1).

Next, the output of the mod-2 counter 32 changes to 0, the quantity $V_c$ is removed from the input of adder 10 (Adder A), and its output now displays an exact duplicate of the output of memory 14 (ROM B1). The output of memory unit 12 (ROM A) is now:

$$w = 256^{\log_{256} |\cos(f_1 \cdot a_1 \cdot \pi/4000)|}$$

Adder 34 (Adder B) now subtracts this quantity from storage 46 (Accumulator A), or adds it if the previous operation was subtract. The net change in the contents of storage 46 (Accumulator A) is therefore:

$$256^{|V_c| + \log_{256} |\cos(f_1 \cdot a_1 \cdot \pi/4000)|} - 256^{\log_{256} |\cos(f_1 \cdot a_1 \cdot \pi/4000)|}$$

The contents of Accumulator A represent a subtotal of the real part of $V_{f_1}$. The mod-12 counter then advances from 0 to 1 and the process is repeated for storage unit 47 (Accumulator B) and its contents represent a subtotal of the imaginary part of $V_{f_1}$. This process is then repeated for the other five pairs of storage units (48–49, 50–51, 52–53, 54–55, 56–57) using the same PCM sample $V_c$. The mod-80 counter 28 then advances, changing the outputs of memory units 14–25 (ROM B1–B12), and the entire process is repeated on all 12 accumulators for all 80 samples.

The result of the operation of the circuit is that the real part and imaginary part of each $V_f$, namely $V_{f_1}$ through $V_{f_6}$, will be totaled in the appropriate storage units 46–57 (Accumulators A through L). The Accumulators which contain substantial totals at the end of a certain time interval (chosen to be 10 milliseconds) will therefore respectively contain data which represents the control tones present in the original $V_a$, as required. Well known apparatus can then read out the data representing the control tones, and the control circuitry of the switching system then interprets the meaning of these tones accordingly.

The numbers 255 and 256 appearing in the above formulas were based on industry standards and could be changed to accommodate other standards. Also, the 10-millisecond interval stated previously for sampling and filling storage units 46–57 is a compromise of low error rate versus speed of operation and the required accuracy of the generated tones. This interval could be changed if the relative importance of these factors changes. To improve the error rate even further, more precision (more bits) could be used to represent the various digital quantities.

Figure 3:
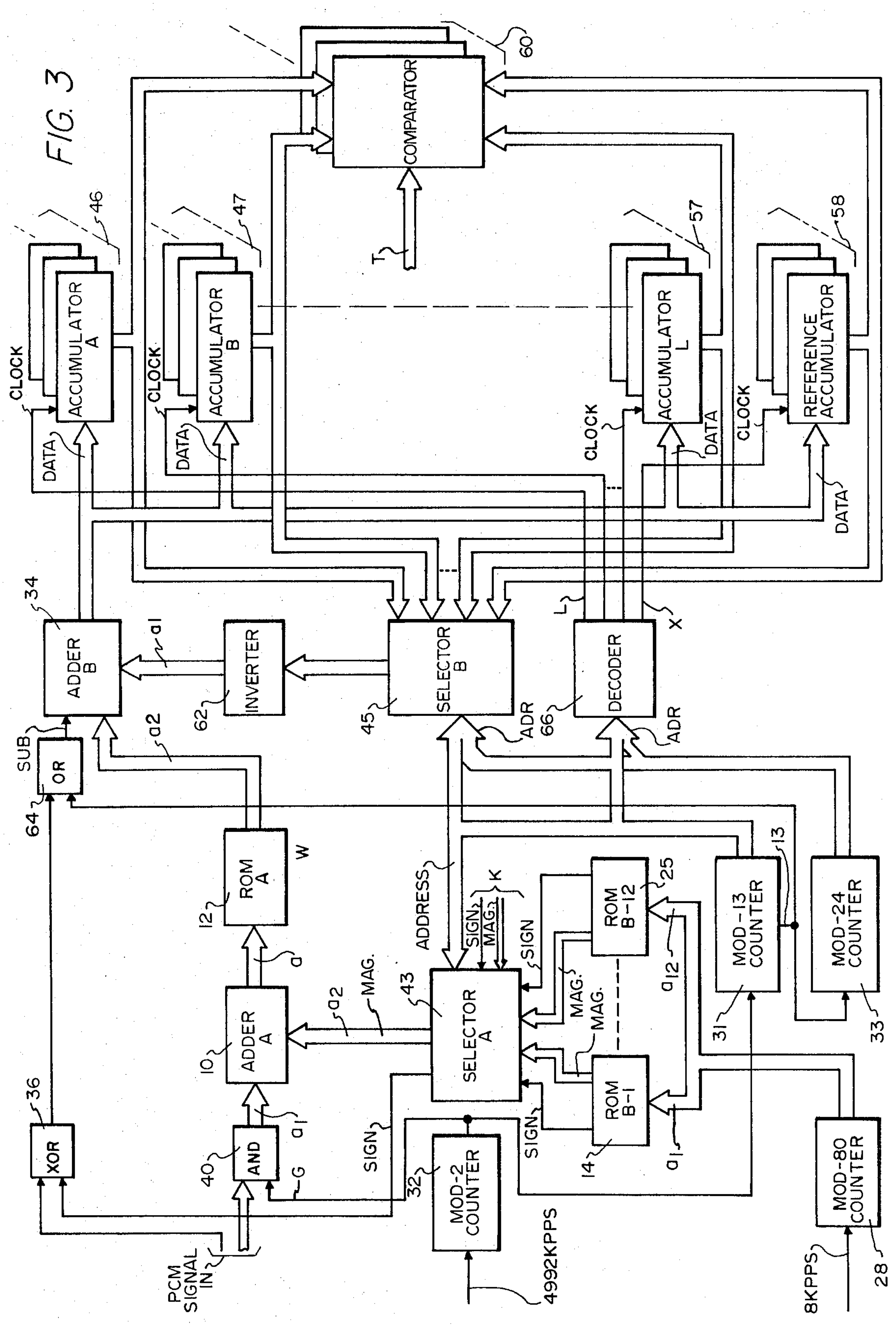
FIG. 3 illustrates an improved PCM tone receiver and the preferred embodiment of the present invention.

FIG. 3 illustrates an alternative preferred embodiment of an improved PCM tone receiver incorporating the principles of this invention. Much, but not all, of the standard logic circuitry of the embodiment shown in FIG. 3 is the same as that employed with the previously described apparatus shown in FIGS. 1 and 2. Among these identical circuits are a 7-bit adder 10 designated Adder A, and a 256-word, 8-bit Read Only Memory 12 designated ROM-A, written at the time of its manufacture, with the contents of each word being the same as previously noted.

Similarly, 12 Read Only Memory units 14–25, designated ROM-B1 through ROM-B12 are 80-word, 8-bit memories. The first bit of each word is the "sign" bit ($s_n$) and the remainder comprise a 7-bit binary number, the "magnitude" ($m_n$). The contents of each word are related to its address "$a_n$" as previously described for FIGS. 1 and 2.

The mod-80 binary counter 28 is a conventional binary counter which resets itself at a count of 80 and is driven by an 8,000 pps signal such that its contents are incremented each 125 microseconds. The mod-2 counter 32 is likewise conventional, resetting itself at a count of 2, and is driven by a 4,992,000 pps signal. Mod-13 counter 31 resets itself at a count of 13, and, when driven by a 2,496,000 pps signal from the output of the mod-2 counter 32, is incremented 312 times for each increment of counter 28. Mod-24 counter 33 resets itself at a count of 24 and when driven by a 192,000 pps signal from the 13 output of counter 31 is incremented 24 times for each increment of counter 28.

The exclusive-OR gate 36 and the AND circuit 40 are the same as in FIGS. 1 and 2.

Selector circuit 43 designated Selector A is provided with 13 8-bit data inputs, a 4-bit address input, and an 8-bit data output. The logic of selector 43 is such that its output is equal to the data at the data input whose number corresponds to the binary number applied to the address input. When driven by the mod-13 counter 31 the 8-bit data output of selector 43 sequentially assumes the values of the twelve inputs from memory units 14–25 and then the constant value, K, which is hard-wired into the 13 input. The selector circuit 45 designated Selector B is basically similar to selector 43 in operation, however, it has 312 data inputs and one data output, each are of 16 bits, and the address input is 9-bits. Four of its address bits are provided by MOD-13 counter 31, and the remaining five are provided by Mod-24 counter 33.

Adder unit 34, designated Adder B, is an adder-subtractor, with the add-subtract function controlled by input "SUB." The 8-bit data output, $a_2$, of memory 12 is thus either added to or subtracted from the 16 bit data output, $a_1$, of selector 45, after the latter is inverted by inverter circuit 62. The output of adder 34 is thus also a 16-bit binary number. The SUB input will be either a logic 1 or 0 depending upon the states of the inputs to OR gate 64, which are the count-13 output from the mod-13 counter 31 and the output from exclusive-OR gate 36. The inputs to adder 34 are such that:

if SUB = 0 then output $= a_1 + a_2$ and if SUB = 1 then output $= a_1 - a_2$.

The storage units 46 through 57 designated "Accumulator A–L," as well as reference accumulator 58, are each standard 16-bit registers and are duplicated for each PCM channel at the input of the receiver. Two accumulators, one each for the real and imaginary portions of each tone to be detected, are used. Thus in the typical PCM telephone switching system assumed here, which includes 24 PCM channels on which six multifrequency tones are to be detected, there will be 288 such accumulators used. The reference accumulator 58 will also be duplicated for each channel thus making a total of 312 accumulators in all.

The logic of each of these accumulators is such that when the clock input is switched from 0 to 1 and back to 0, the 16-bit binary number present at the data input appears at the data output and remains there until the input clock, is again switched. Although the data input may vary between switching of the input clock, the data output remains constant.

The clock input to each accumulator is driven by a standard decoder circuit 66 which causes a pulse to appear at the output designated by the binary number on its data input. When driven by the mod-13 and mod-24 counters 31 and 33 in the same manner as selector 45, the 312 outputs L through X, which are coupled respectively to the clock-inputs of the accmulators 46–58, each duplicated 24 times, are pulsed in sequence.

The data output of each accumulator 46–57 is coupled to a comparator circuit 60 which operates to compare the data output of each accumulator with that of the reference accumulator 58 for the same channel. Additionally, a constant reference value, T, may be coupled to the comparator 60 to provide data output corresponding to a preselected minimum signal strength below which it is desired to reject any tone signals.

The basic differences between the alternative preferred embodiment shown in FIG. 3 and that described in connection with FIGS. 1 and 2 are the duplication of accumulators 46 through 57 for each of 24 PCM channels, the addition of a counter 33 to count the PCM channels, the addition of reference accumulator 58 and the comparator 60 for each PCM channel, the addition of inverter circuit 62 between selector 45 and adder 34, the use of a counter 31, a decoder 66, and selectors 43 and 45 having capacities increased to accommodate the additional reference accumulators 58 and duplicated accumulators 46 through 57, and the deletion of an exclusive-OR gate (38) from the sign-bit output of previous selector 42 (FIG. 1). The improved efficiency of operation provided by this embodiment of the present invention will become more apparent from the description of its operation.

Initially the output of the mod-2 counter 32 is at 1 and the outputs of the mod-80, and mod-13 and mod-24 counters 28, 31 and 33, respectively, are at zero. A sample of the PCM signal of the first channel, equal to $128 \cdot V_c$ ($V_c$ being the compressed voltage) is presented at the input of the tone receiver. The 7-bit binary number representing the magnitude of the sample passes through AND circuit 40 to one input of adder 10. The 8 bit of the sample represents the sign of the sample and is coupled to one input of exclusive-OR gate 36. The sample magnitude is added to the output of memory 14 which is routed through selector 43. The output of adder 10 is therefore $$128 \cdot |V_c| + 128 \cdot {}^{log}256 | \cos(f_1 \cdot a_1 \cdot \pi/4{,}000) |$$

Since the output of memory 14 is always negative, the output of adder 10 may be either positive or negative and the 8 bit of the output will specify the sign. The output of adder 10 is coupled to Read-Only Memory, 12, such that the output thereof is $$w = 256^{|V_c| + \log_{256} |\cos(f_1 \cdot a_1 \cdot \pi/4000)|}$$

This output of memory 12 (call it A), which is always positive, is added to or subtracted from the data, $a_1$, stored in accumulator 46 by adder 34. The data output of accumulator 46 passes through selector 45 and is inverted by inverter circuit 62 prior to being coupled to the input of adder 34. As stated hereinabove the add-subtract function of adder 34 is controlled by the output of exclusive-OR gate 64 which depends upon the sign of the incoming compressed voltage, $V_c$, and the sign being read from memory 14. After the addition or subtraction the output of adder 34 is stored in accumulator 46.

Next the output of the mod-2 counter 32 changes to 0, and the quantity, $V_c$, is removed from the input of adder 10 such that the output thereof becomes an exact duplicate of the output from memory 14. The output of memory 12 is now:

$$w=256^{\log_{256}|\cos(f_1\cdot a_1\cdot \pi/4000)|}$$

Adder 34 adds this quantity (call it B) to the inverted quantity just previously stored in accumulator 46 (or subtracts if the previous operation was a subtraction).

By employing an inverter circuit 62 between selector 45 and adder 34 it has been found by the applicant that the receiver circuitry may be substantially simplified by the elimination of an exclusive OR gate (38) between the sign output of selector 42 and the input of exclusive-OR gate 36. Assuming that the output of memory 12 is equal to either A or B as defined above, and assuming that the output of accumulator 46 equals S, then the adder 34 must perform the following functions if inverter 62 is not used:

| | |
|---|---|
| (S) + (A) = S + A | (addition) |
| (S+A) − (B) = S+A − B | (subtraction) |

This requires one addition and one subtraction. Through the use of the inverter 62 it is possible to reach the same result while keeping both operations identical, i.e., additions or subtractions. Thus it is unnecessary that the SUB input to adder 34 be switched during the processing of each sample. Specifically the functions performed by the inverter 62 and adder 34 are:

| | |
|---|---|
| S·(−1) = −S | (Inversion) |
| (−S)−(A) = −S−A | (Subtraction) |
| (−S−A)·(−1) = S+A | (Inversion) |
| (S+A)−(B) = S+A−B | (Subtraction) |

Although this process may at first appear more complex than that used without the inverter 62 is permits the deletion of relatively complex exclusive-OR circuitry from the sign output of previous selector 42 (FIG. 1) and permits the direct coupling of this sign output to one input of exclusive-OR gate 36. The inverter, on the other hand, is a simple circuit and may even be made a part of selector 45.

The net change in the contents of accumulator 46 as a result of the two subtractions is thus A–B, or:

$$256^{|V_c|+\log_{256}|\cos(f_1\cdot a_1\cdot \pi/4000)|}-256^{\log_{256}|\cos(f_1\cdot a_1\cdot \pi/4000)|}$$

If the two operations had been additions, the net change would instead be the negative of the above expression.

The mod-13 counter then advances from zero to 1 and the process is repeated for the other 11 accumulators 47–57 using the same PCM sample, $V_c$.

When the mod-13 counter reaches a count of 13 an output pulse is coupled to the second input of OR gate 64. This pulse forces the sign signal to 1 and the output of AND circuit 40 thus represents the absolute value of the incoming signal magnitude, $|V_c|$. The output of selector 43 is the constant value, K, which is hardwired to the 13 input of selector 43. This quantity is processed in the same manner as the outputs of the memories 14–25 and is stored in the reference accumulator 58. The net change in the contents of the reference accumulator is thus:

$$256^{V_c+K/128}-256^{K/128}$$

which is equivalent to $$256^{K/128}(256^{|V_c|}-1)$$

The mod-24 counter 33 then advances changing the address applied to selector 45 and decoder 66 and simultaneously a sample from the next channel appears at "PCM SIGNAL IN," and the process is repeated for that channel, and so on, each channel using a different set of accumulators 46 through 58.

The mod-80 counter 28 then advances, changing the outputs of memory units 14–25, and the entire process is repeated on each of the accumlators for all 80 samples on all 24 channels.

At the completion of the operation the real part and the imaginary part of each audio tone, $V_f$, specifically $V_{f_1}$ through $V_{f_6}$, for each channel, will be totaled in the appropriate accumulators 46–57 (duplicated for each channel). The reference accumulator 58 (also duplicated for each channel) will contain the quantity $V_r$, where:

$$V_r = 256^{K/128}\Sigma(256^{|V_c|}-1) = 256^{K/128}255\cdot\Sigma|V_a|$$

or, $$V_R = C\,\Sigma|V_a|,$$

where $$C = 256^{K/128}\cdot 255$$

The quantity $V_r$ represents the average strength of the analog signal $|V_a|$, coded into each PCM channel, i.e., proportional to the amplitude of the audio but independent of frequency. The constant of proportionality will depend on the number, $K$. The accumulators 46–58 will thus contain various totals at the end of 80 samples, or a time interval of 10 milliseconds. Accumulators 46–57 will contain data which represents the control tones present in the original analog voltage, and the reference accumulator will contain data which represents the strength of the audio signal.

At the end of the monitoring interval the contents of the accumulators for the real part and the imaginary part of each audio tone are coupled to a conventional comparison circuit 60 the logic of which is arranged such that an output logic signal representing the presence of a given one of the audio tones in a certain channel will be produced only if the absolute value of the accumulated total representing either the real part or the imaginary part (or both) of that tone exceeds the quantity stored in the reference accumulator 58. The number $K$ was chosen to achieve the desired threshold of detection; a typical value is 87. If both the accumulated magnitudes are less than the quantity stored in the reference accumulator for the same channel, the audio tone will be deemed not present in the incoming signal and the appropriate logic signal will be produced at that output of the comparison circuit 60.

While the use of a reference accumulator 58 and comparison circuit 60 would, in theory, be unnecessary if the analog signal $V_a$ were of a fixed level, this condition may not be relied upon in many practical systems. Through their use, however, the amplitude of each tone may be compared to that of the entire signal rather than to a fixed reference level and therefore the tone receiver may be made responsive to a wide dynamic range of input signal amplitudes, the error rate thereby being substantially reduced. In some applications it may be desired to reject very weak tones even though they exceed the specified percentage of the signal strength. Such tones may arise through crosstalk between analog signals before application to the PCM channels. In such cases a constant T may also be hardwired to the comparison circuit 60 such that the accumulator contents for each frequency must exceed both the constant T and the contents of the reference accumulator before a signal representing a valid audio tone is produced. A typical value for T is 113.

By duplicating the accumulators 46–58 for each input channel and scanning them in sequence, the memories 14–25 and the constant input, K, are scanned once for each channel during the 125 microsecond sample period; i.e., there is one scan for each of the duplicated accumulators and the 125/24 microsecond input sample period is compatible without the use of a signal demultiplexer at the input of the tone receiver. Therefore, in 24 scans there is one processed sample from each channel added to each of the 13 accumulators associated with each of the channels. It will be noted that with this approach, although the accumulators are duplicated for each channel, the remainder of the per-channel circuitry need not be duplicated.

Heretofore, it has been assumed that the memories 14–25 and the constant, K, as well as accumulators 46–58 are serially accessed. It will be understood, however, that if reduction of the number of sequential operations should be a more significant than duplication of circuitry, parallel accessing may easily be provided by duplicating the common-to-system circuits for a plurality of memory-accumulator combinations.

From the foregoing it will be seen that the Applicant has provided improvements in PCM tone receivers whereby the objectives set forth hereinabove are efficiently attained. Certain changes will occur to those skilled in the art without departure from the scope of the invention. For example, Read-Only-Memories 14–25 together with selector 43 may be realized as a single large memory with an 11-bit address input. A similar observation is possible for accumulators 46–58, selector 45, decoder 66, and inverter 62. It is therefore intended that all matter set forth in the description or shown in the appended drawings shall be interpreted as illustrative and not in any limiting sense.

What is claimed is:

1. The method of deriving information for detecting at least one tone, $f_1$, from a PCM signal, $V_c$, corresponding to an original analog signal, $V_a$, comprising the steps of:

sequentially providing one of a plurality of samples of said PCM signal during a discrete time interval from $t=1$ to $t=n$;

automatically evaluating said sequential samples of said PCM signal, $V_c$, during said time interval using the expression:

$$V_f=\sum_{t=1}^{n} S\cdot[S'\cdot(256^{|V_c|+\log_{256}|\cos 2\pi ft|}-256^{\log_{256}|\cos 2\pi ft|})+jS''(256^{|V_c|+\log_{256}|\sin 2\pi ft|}-256^{\log_{256}|\sin 2\pi ft|})$$

where $S$ is the sign of $V_a$;

$S'$ is the sign of cos $2\pi ft$;

$S''$ is the sign of sin $2\pi ft$;

including the steps of, providing reference quantities $S'$, $S''$, $\log_{256}|\cos 2\pi ft|$ and $\log_{256}|\sin 2\pi ft|$ corresponding to said tone signal, $f_1$;

sequentially determining with said reference quantities the magnitude and sign of the real part of said expression, $V_f$, (Real $V_f$) for each of said plurality of PCM signal samples;

storing the algebraic sum of said last mentioned signed magnitude (Real $V_f$) at the end of said time interval;

sequentially determining with said reference quantities the magnitude and sign of the imaginary part of said expression, $V_f$, (Imag. $V_f$) for each of said plurality of PCM signal samples;

storing the algebraic sum of said last mentioned signed magnitude (Imag. $V_f$) at the end of said time interval;

the magnitude of the complex number represented by said stored algebraic sums corresponding to Real $V_f$ and Imag. $V_f$ being proportional to the magnitude of said tone signal, $f_1$ present in said original analog signal.

2. The method of claim 1, wherein said storing of said algebraic sum corresponding to Real $V_f$ includes the steps of:

storing an initial Real $V_f$ determined for an initial sample of said PCM signal;

reading from storage said initial Real $V_f$;

determining a sub-total Real $V_f$ corresponding to the combination of said initial Real $V_f$ and a second Real $V_f$ determined for the next sample of said PCM signal;

storing said sub-total Real $V_f$;

repeating said steps during said time interval so that at the end thereof, the total Real $V_f$ for said PCM signal samples is stored.

3. The method of claim 2, wherein said storing of said algebraic sum corresponding to Imag. $V_f$ includes the steps of:

storing an initial Imag. $V_f$ determined for an initial sample of said PCM signal;

reading from storage said initial Imag. $V_f$;

determining a sub-total Imag. $V_f$ corresponding to said initial Imag. $V_f$ and a second Imag. $V_f$ determined for the next sample of said PCM signal;

storing said sub-total Imag. $V_f$;

repeating said steps during said time interval so that at the end thereof, the total Imag. $V_f$ for said PCM samples is stored.

4. The method of claim 1, including, sequentially determining from said PCM signal, a quantity, $V_r$, proportional to the amplitude of said analog signal, $V_a$, and storing said quantity, $V_r$.

5. The method of claim 4, including comparing the stored quantity, $V_r$, to said magnitude (Real $V_f$) to determine the presence of a tone signal.

6. The method of claim 4, including comparing the stored quantity, $V_r$, to said magnitude (Imag. $V_f$) to determine the presence of a tone signal.

7. A PCM tone signal receiver for deriving information for detecting at least one tone signal, $f_1$, from a plurality of samples of a PCM signal, $V_c$, corresponding to an original analog signal, $V_a$, comprising:

means for evaluating said samples of said PCM signal, $V_c$, sequentially during a time interval $t=1$ to $t=n$ using the expression:

$$V_f=\sum_{t=1}^{n} S\cdot[S'\cdot(256^{|V_0|+\log_{256}|\cos 2\pi ft|}-256^{\log_{256}|\cos 2\pi ft|})$$

$$+jS''(256^{|V_0|+\log_{256}|\sin 2\pi ft|}-256^{\log_{256}|\sin 2\pi ft|})$$

where $S$ is the sign of $V_a$;

$S'$ is the sign of $\cos 2\pi ft$;

$S''$ is the sign of $\sin 2\pi ft$;

said means including;

reference means for providing reference quantities $S'$, $S''$, $\log_{256}|\cos 2\pi ft|$ and $\log_{256}|\sin 2\pi ft|$ corresponding to said tone signal;

means responsive to said reference quantities for sequentially determining the magnitude and sign of the real part of said expression, $V_f$, (Real $V_f$) for each of said plurality of PCM signal samples;

first accumulator storage means for storing the algebraic sum of said last mentioned signed magnitude (Real $V_f$) at the end of said time interval;

means responsive to said reference quantities for sequentially determining the magnitude and sign of the imaginary part of said expression, $V_f$, (Imag. $V_f$) for each of said plurality of PCM signal samples; and second accumulator storage means for storing the algebraic sum of said last mentioned magnitude (Imag. $V_f$) at the end of said time interval;

the magnitude of the complex number represented by said stored algebraic sums in said first and second accumulator means corresponding respectively to Real $V_f$ and Imag. $V_f$ being proportional to the magnitude of said tone signal, $f_1$, present in said original analog signal.

8. A PCM signal receiver as claimed in claim 7, wherein said means for storing the algebraic sum corresponding to Real $V_f$ comprises means for accumulating sub-total Real $V_f$ values including;

means for storing an initial sub-total Real $V_f$ determined for an initial sample of said PCM signal in said first accumulator means;

means for reading said initial Real $V_f$ from said first accumulator means;

means for determining a sub-total Real $V_f$ corresponding to the combination of said initial Real $V_f$ and a second Real $V_f$ determined for the next sample of said PCM signal and providing a corresponding output;

selector means for selectively coupling said output to said first accumulator means for storing said subtotal Real $V_f$ in said first accumulator means.

9. A PCM signal receiver as claimed in claim 8, wherein said means for storing the algebraic sum corresponding to Imag. $V_f$ comprises means for accumulating sub-total Imag. $V_f$ values including;

means for storing an initial sub-total Imag. $V_f$ determined for an initial sample of said PCM signal in said second accumulator means;

means for reading said initial Imag. $V_f$ from said second accumulator means;

means for determining a sub-total Imag. $V_f$ corresponding to the combination of said initial Imag. $V_f$ and a second Imag. $V_f$ determined for the next sample of said PCM signal and providing a corresponding output;

said selector means selectively coupling said output to said second accumulator means for storing subtotal Imag. $V_f$ in said second accumulator means.

10. A PCM signal receiver as claimed in claim 9 for detecting one or more tone signals, $f_1$ to $f_n$, from a plurality of samples of said PCM signal, said detector further including, a plurality of said first and second accumulator means for respectively storing said sub-total and total Real $V_f$ and Imag. $V_f$ corresponding to each of said tone signals;

a plurality of said reference means for providing said reference quantities corresponding to each of said tone signals;

reference quantity selector means coupled to said reference means for respectively sequentially selecting each of said reference quantities; and timing control means coupled to said means responsive to said reference quantities and to said plurality of first and second accumulator means for sequentially determining Real $V_f$ and Imag. $V_f$ for each of said plurality of PCM signal samples and storing the respective algebraic sums in respective accumulator means, the magnitude of the complex number represented by said respective algebraic sums being proportional to the magnitudes of said respective tone signals present in said original analog signal.

11. A PCM signal receiver as claimed in claim 7, including, means responsive to said PCM signal samples for sequentially determining a quantity, $V_r$, proportional to the amplitude of said analog signal, $V_a$, and third accumulator storage means for storing said quantity, $V_r$.

12. A PCM signal receiver as claimed in claim 11, including comparator means for comparing said stored quantity, $V_r$, to said stored magnitude (Real $V_f$) to determine the presence of a tone signal.

13. A PCM signal receiver as claimed in claim 11, including comparator means for comparing the stored quantity $V_r$ to said stored magnitude (Imag. $V_f$) to determine the presence of a tone signal.

14. A PCM tone signal receiver as claimed in claim 7, including:

means for providing a reference quantity, $K$, associated with said expression corresponding to said tone signal, said reference quantity, $K$, being chosen according to the desired threshold of detection of said tone signal, $f_1$;

means for measuring the strength of said original analog signal, $V_a$, using the expression:

$$V_r=256^{K/128}\cdot\sum_{t=1}^{n}(256^{|V_c|}-1)$$

where $V_a=S\cdot(256^{|V_c|}-1)/255$ said means including;

means receiving said PCM signal samples and a constant, $256^{K/128}\cdot 255$, determined by said reference quantity, $K$, for sequentially determining the magnitude of $V_r$ for each of said samples;

means for sequentially storing and totalling said magnitude of $V_r$ over said time interval, and means for comparing the magnitude of the real and imaginary parts of said quantity $V_f$ to the magnitude of said quantity, $V_r$, said tone, $f_1$, being deemed present if and only if either or both of said magnitudes of said real and imaginary parts of $V_f$ exceed said magnitude of $V_r$.

15. A PCM tone signal receiver for deriving information for detecting at least one tone signal, $f_1$, from a plurality of samples of a PCM signal, $V_c$, corresponding to an original analog signal, $V_a$, comprising:

means for evaluating said samples of said PCM signal sequentially during a time interval $t=1$ to $t=n$ using the expression:

$$V_f=\sum_{t=1}^{n}S\cdot[(256^{|V_c|}-1)/255]\ (\cos 2\pi ft+j\sin 2\pi ft)$$

where $V_a=S\cdot(256^{|V_c|}-1)/255$ said means including, means for providing reference quantities proportional to $\cos 2\pi ft$ and $\sin 2\pi ft$ associated with said expression corresponding to said tone signal;

means receiving said reference quantities and said PCM signal samples for sequentially determining the magnitude and sign of $V_f$ for each of said samples, and means for sequentially storing and algebraically totalling said signed magnitude of $V_f$ over said time interval, the magnitude of the complex number represented by said algebraic totals of said signed magnitude of $V_f$ being proportional to the magnitude of said tone signal present in said original analog signal.

16. A PCM tone signal receiver as claimed in claim 15, including:

means for providing a reference quantity, $K$, associated with said expression corresponding to said tone signal, said reference quantity, $K$, being chosen according to the desired threshold of detection of said tone signal, $f_1$;

means for measuring the average strength of said original analog signal, $V_a$, using the expression:

$$V_r=256^{K/128}\cdot\sum_{t=1}^{n}(256^{|V_c|}-1)$$

where $V_a=S\cdot(256^{|V_c|}-1)/255$ said means including;

means receiving said PCM signal, and a constant, $256^{K/128}\cdot 255$, determined by said reference quantity, $K$, samples for sequentially determining the magnitude of $V_r$ for each of said samples;

means for sequentially storing and totalling said magnitude of $V_r$ over said time interval, and means for comparing the magnitude of the real and imaginary parts of said quantity $V_f$ to the magnitude of said quantity, $V_r$, said tone, $f_1$, being deemed present if and only if either or both of said magnitudes of said real and imaginary parts of $V_f$ exceed said magnitude of $V_r$.

* * * * *

UNITED STATES PATENT OFFICE
CERTIFICATE OF CORRECTION

PATENT NO. : 3,863,030

DATED : 1-28-75

INVENTOR(S) : JEFFREY P. MILLS

It is certified that error appears in the above-identified patent and that said Letters Patent are hereby corrected as shown below:

Col. 14, line 23 delete "detector" and insert -- receiver --

Col. 15, line 1 before "strength" insert -- average --

Signed and sealed this 6th day of May 1975.

(SEAL)
Attest:

RUTH C. MASON
Attesting Officer

C. MARSHALL DANN
Commissioner of Patents
and Trademarks